(12) United States Patent
Wang et al.

(10) Patent No.: US 8,843,078 B2
(45) Date of Patent: Sep. 23, 2014

(54) METHOD AND DEVICE FOR PROCESSING FIRMWARE OVER THE AIR (FOTA) UPGRADE

(75) Inventors: Xiaomei Wang, Shenzhen (CN); Chao Zhang, Shenzhen (CN); Ke Mao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 265 days.

(21) Appl. No.: 13/259,372

(22) PCT Filed: Nov. 12, 2010

(86) PCT No.: PCT/CN2010/078693
§ 371 (c)(1),
(2), (4) Date: Feb. 13, 2012

(87) PCT Pub. No.: WO2012/012983
PCT Pub. Date: Feb. 2, 2012

(65) Prior Publication Data
US 2012/0184319 A1    Jul. 19, 2012

(30) Foreign Application Priority Data

Jul. 30, 2010  (CN) .......................... 2010 1 0246623

(51) Int. Cl.
*H04B 17/00*    (2006.01)
*H04W 4/00*    (2009.01)
*G06F 9/445*    (2006.01)
*H04L 29/08*    (2006.01)

(52) U.S. Cl.
CPC .............. *H04L 67/34* (2013.01); *H04W 4/001* (2013.01); *G06F 8/65* (2013.01)
USPC ...................................... 455/67.11; 455/517

(58) Field of Classification Search
USPC .............................................. 455/67.11, 517
See application file for complete search history.

(56) References Cited

U.S. PATENT DOCUMENTS

| | | | |
|---|---|---|---|
| 8,365,158 B2 * | 1/2013 | Bolanowski | 717/168 |
| 2005/0229171 A1 * | 10/2005 | Henry et al. | 717/168 |
| 2008/0216066 A1 * | 9/2008 | Oh | 717/173 |
| 2009/0044191 A1 | 2/2009 | Chai et al. | |
| 2009/0063187 A1 | 3/2009 | Johnson et al. | |
| 2009/0319848 A1 | 12/2009 | Thaper | |

FOREIGN PATENT DOCUMENTS

| | | |
|---|---|---|
| CN | 1665155 A | 9/2005 |
| CN | 1949718 A | 4/2007 |
| CN | 101335703 A | 12/2008 |
| WO | 2004021149 A2 | 3/2004 |
| WO | 2005001665 A2 | 1/2005 |

OTHER PUBLICATIONS

Supplementary European Search Report for corresponding European App. No. EP 10 85 5210, mailed Feb. 14, 2013.

* cited by examiner

*Primary Examiner* — Tuan H Nguyen
(74) *Attorney, Agent, or Firm* — Christopher L. Parmelee; Walker & Jocke (57) ABSTRACT

The invention discloses a method and device for processing the FOTA upgrade. The method comprises: a transmitting terminal configures resources and transmits an upgrade package for version upgrade to a receiving terminal; the receiving terminal is upgraded by the received upgrade package and transmits identification information which is used for indicating the upgrade result of the receiving terminal to the transmitting terminal over the resources corresponding to the upgrade package; and the transmitting terminal determines the upgrade result of the receiving terminal according to the identification information. The invention improves the reliability and stability of the system.

8 Claims, 5 Drawing Sheets

METHOD AND DEVICE FOR PROCESSING FIRMWARE OVER THE AIR (FOTA) UPGRADE

TECHNICAL FIELD OF THE INVENTION

The invention relates to the field of communications, in particular to a method and device for processing Firmware Over the Air (FOTA) update and upgrade.

BACKGROUND OF THE INVENTION

At present, mobile terminal operators pay more and more attention to user experience, and convenience is the first factor to be considered by a user when he selects a service. The FOTA is an update technology for managing mobile terminals (such as cell phones, wireless personal digital assistants, and laptop computers) and fixed wireless terminals. It can help a terminal manufacture to fix software faults of a mobile phone that is already on the market by downloading an upgrade package over the air. And it can add new functions and characteristics for phone software, shorten the time of the R&D and marketing of terminal products to a certain extent, and also avoid the burden of assessing a customer service center for updating the firmware or applications of a mobile terminal for a user. For a user, the FOTA technology can keep the version of phone software in the up-to-date state, so that a user can update terminal software more conveniently.

However, as a newly emerging technology, the FOTA is not mature enough and failure (such as, flash reading error, version check error, mismatched or damaged differential package) will inevitably occur in a version upgrading process. The inventors found that in the related technologies, once the version fails to be upgraded, the abnormality cannot be correspondingly processed in time as the server cannot acquire the failure information, so that the user experience is affected and the popularization of the FOTA application is limited to a certain extent.

SUMMARY OF THE INVENTION

The main object of the invention is to provide a solution for processing the FOTA upgrade, in order to at least solve the problems that the user experience is poor and the application of the FOTA is limited as the server cannot acquire the version upgrade failure information in the related technologies.

In order to achieve the object, according to one aspect of the invention, a method for processing the FOTA upgrade is provided.

The method for processing the FOTA upgrade comprises the following steps: a transmitting terminal configures resources and transmits an upgrade package for version upgrade to a receiving terminal; the receiving terminal is upgraded by the received upgrade package and, transmits identification information which is used for indicating the upgrade result of the receiving terminal to the transmitting terminal over the resources corresponding to the upgrade package; and the transmitting terminal determines the upgrade result of the receiving terminal according to the identification information.

Further, the identification information comprises at least one of the following: the statistical information in a sequence form, and the statistical information in a bit form.

Further, the step that the transmitting terminal determines the upgrade result of the receiving terminal according to the identification information comprises: the transmitting terminal detects the energy or power of a signal transmitted by the receiving terminal and carrying the identification information over the resources, and judges whether the energy or power exceeds a predetermined threshold; if so, the receiving terminal fails to be upgraded, otherwise, the receiving terminal is upgraded successfully.

Further, the signal comprises at least one of the following: one or more sequences of an orthogonal sequence set, one or more sequences of a self-correlation sequence set and, a mutual-correlation sequence set.

Further, one sequence in the orthogonal sequence set, the self-correlation sequence set or the mutual-correlation sequence set corresponds to a resource; and different upgrade packages correspond to different resources.

Further, the step that the transmitting terminal determines the upgrade result of the receiving terminal according to the identification information comprises: when the identification information is the statistical information in the bit form, the transmitting terminal determines whether the receiving terminal is upgraded successfully according to the bit value of the statistical information in the bit form.

Further, before the transmitting terminal determines the upgrade result of the receiving terminal according to the identification information, the method further comprises: the transmitting terminal receives the statistical information in the bit form over the resources corresponding to the statistical information in the bit form.

In order to achieve the object, according to another aspect of the invention, a device for processing the FOTA upgrade is provided.

The device for processing the FOTA upgrade comprises a transmitting terminal and a receiving terminal, wherein the transmitting terminal comprises: a configuration module adapted to configure resources; a first transmitting module adapted to transmit an upgrade package for version upgrade to the receiving terminal; and a determination module adapted to determine the upgrade result of the receiving terminal according to the identification information which is transmitted by the receiving terminal and adapted to indicating the upgrade result of the receiving terminal; and the receiving terminal comprises: an upgrading module adapted to perform upgrade by the received upgrade package, and a second transmitting module adapted to transmit the identification information to the transmitting terminal over the resources corresponding to the upgrade package.

Further, the determination module comprises: a detecting unit adapted to detect the energy or power of a signal transmitted by the receiving terminal and carrying the identification information over the resources; and a judging unit adapted to judge whether the energy or power exceeds a predetermined threshold; if so, the receiving terminal fails to be upgraded, otherwise, the receiving terminal is upgraded successfully.

Further, the transmitting terminal further comprises: a grouping module adapted to group the receiving terminals that need the same upgrade package into a group; and an upgrade stopping module adapted to stop the upgrade of the receiving terminals in a group in which the number of the receiving terminals failing to be upgraded reaches the predetermined value.

In the invention, by feeding back the upgrade result from the receiving terminal, the problems that the user experience is poor and the application of the FOTA is limited as the server cannot acquire the version upgrade failure information in the related technologies are solved, and the reliability and stability of the system are improved.

BRIEF DESCRIPTION OF THE DRAWINGS

The drawings herein are used for the further understanding of the present invention and compose one part of the application, and the schematic embodiments of the present invention and description thereof are used for the explanation of the present invention and not limiting the present invention. In the drawings.

DETAILED DESCRIPTION OF THE INVENTION

The present invention will be explained below in detail with reference to the drawings and in conjunction with the embodiments. It should be noted that, if not conflicted, the embodiments and features thereof in the application can be combined with one another.

Figure 1:
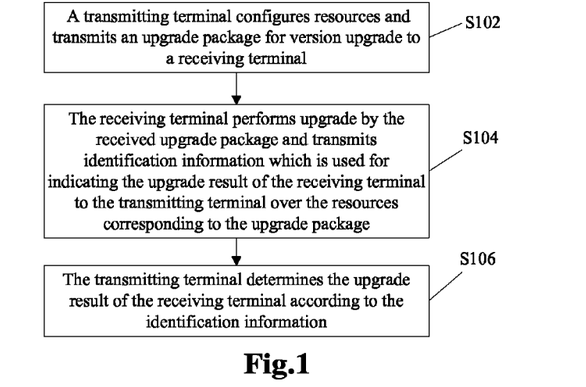
FIG. 1 is a flowchart of a method for processing the FOTA upgrade according to one embodiment of the invention.

FIG. 1 is a flowchart of a method for processing the FOTA upgrade according to one embodiment of the invention. As shown in FIG. 1, the method comprises the following steps:

S102: a transmitting terminal configures resources and transmits an upgrade package for version upgrade to a receiving terminal;

S104: the receiving terminal is upgraded by the received upgrade package and transmits identification information which is used for indicating the upgrade result of the receiving terminal to the transmitting terminal over resources corresponding to the upgrade package; and S106: the transmitting terminal determines the upgrade result of the receiving terminal according to the identification information.

In the embodiment, by feeding back the upgrade result from the receiving terminal, the problems that the user experience is poor and the application of the FOTA is limited as the server cannot acquire the version upgrade failure information in the related technologies are solved, and the reliability and stability of the system are improved.

Preferably, the identification information can comprise at least one of the following: statistical information in the sequence form and, statistical information in the bit form, such as correct/erroneous marker information in the sequence form, or correct/erroneous marker information in the bit form, or the combined statistical information of correct/erroneous marker information in the bit form and upgrade package marker information.

Preferably, in S106, the transmitting terminal detects the energy or power of a signal transmitted by the receiving terminal and carrying the identification information over the resources (such as frequency and time), and judges whether the energy or power exceeds the predetermined threshold; if so, the receiving terminal fails to be upgraded; otherwise, the receiving terminal is upgraded successfully. The method can improve the error tolerance and precision of the system.

Preferably, the signal comprises at least one of the following: one or more sequences of an orthogonal sequence set, one or more sequences of a self-correlation sequence set and, one or more sequences of a mutual-correlation sequence set. The method is simple to implement and strong in operability.

Preferably, one sequence in the orthogonal sequence set, the self-correlation sequence set or the mutual-correlation sequence set corresponds to a resource; and different upgrade packages correspond to different resources.

In the embodiment, the transmitting terminal can effectively identify the feedback signal from the receiving terminal so as to precisely judge the upgrade result of the receiving terminal, which improves the precision and effectiveness of the system.

Preferably, before S106, the transmitting terminal receives the statistical information in the bit form over the resources corresponding to the statistical information in the bit form. At the moment, the resources corresponding to the correct/erroneous marker information in the bit form (i.e., the identification information), or the combined statistical information of correct/erroneous marker information in the bit form and upgrade package marker information are the exclusive resources of the receiving terminal.

Preferably, in S106, the receiving terminals that need the same upgrade package are grouped into a group; and a transmitting terminal stops the upgrade of the receiving terminals in a group in which the number of the receiving terminals failing to be upgraded reaches the predetermined value. The method can improve the efficiency of the system and timely stop an error during the running of the system.

Preferably, in S106, when the identification information is the statistical information in the bit form, the transmitting terminal determines whether the receiving terminal is upgraded successfully according to the bit value of the statistical information in the bit form. For example, the correct/erroneous marker information (i.e., the identification information) indicates that the client terminal (i.e., the receiving terminal) is upgraded successfully when the bit value is 1, while indicates that the client terminal fails to be upgraded when the bit value is 0, and vice versa. The method is simple to implement and has a strong operability.

Figure 2:
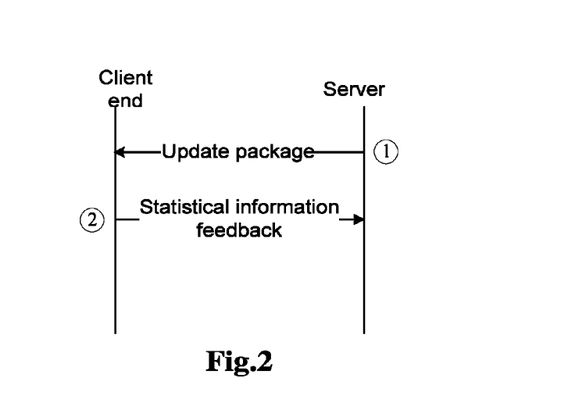
FIG. 2 is a diagram of a method for processing the FOTA upgrade according to one preferred embodiment of the invention.

FIG. 2 is a diagram of a method for processing the FOTA upgrade according to one preferred embodiment of the invention. As shown in FIG. 2, the transmitting terminal is a server, and the receiving terminal is a client terminal (for example, a terminal). The method comprises the following steps:

S202: the server configures a resource (for example, frequency or time) for the client terminal to transmit the statistical information after it is upgraded and transmits an upgrade package to the client terminal.

S204: the client terminal transmits the statistical information over the resource after being upgraded; and S206: the server judges whether the client terminal is upgraded successfully by detecting the energy, power or bit of the statistical information.

Preferably, in S206, the server detects the energy or power of the statistical information. If the energy or power exceeds a predetermined energy or power threshold, then it is deemed that the client terminal transmits statistical information over the resource, i.e., a client terminal failure to be upgraded.

In a specific implementation process, the statistical information can be one or more sequences in an orthogonal sequence set or a sequence set having good self-correlation/mutual-correlation (such as a self-correlation sequence set having no side peak or, having a low side peak and a high peak, and a mutual-correlation sequence set having no obvious peak). Specifically, if there are N kinds of upgrade packages in the current system, the statistical information can select one sequence to correspond to one resource, or select N kinds of upgrade packages to correspond to N resources.

Preferably, the bits of the statistical information comprise correct/erroneous marker information and/or the combination of the correct/erroneous marker information and upgrade package marker information. For example, the correct/erroneous marker information indicates that the client terminal fails to be upgraded when the bit value is 0, while indicates that the client terminal is upgraded successfully when the bit value is 1, and vice versa.

Preferably, the resources corresponding to the statistical information are the exclusive resources of the client terminal. If M client terminals are to be upgraded in the current system, M client terminals correspond to M exclusive resources.

Figure 3:
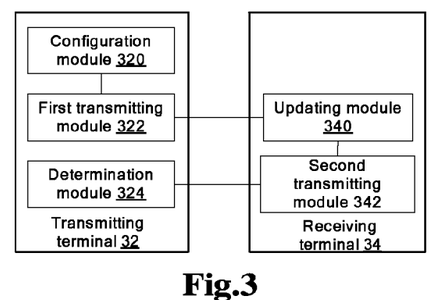
FIG. 3 is a block diagram showing the structure of a device for processing the FOTA upgrade according to one embodiment of the invention.

FIG. 3 is a block diagram showing the structure of a device for processing the FOTA upgrade according to one embodiment of the invention. As shown in FIG. 3, the device comprises a transmitting terminal 32 and a receiving terminal 34, wherein the transmitting terminal 32 comprises: a configuration module 320 adapted to configure resources; a first transmitting module 322 coupled to the configuration module 320 and adapted to transmit an upgrade package for version upgrade to the receiving terminal 34; and a determination module 324 adapted to determine the upgrade result of the receiving terminal 34 according to the identification information which is transmitted by the receiving terminal 34 and used for indicating the upgrade result of the receiving terminal 34; and the receiving terminal 34 comprises: an upgrading module 340 coupled to the first transmitting module 322 and adapted to perform upgrade by the received upgrade package, and a second transmitting module 342 coupled to the upgrading module 340 and the determination module 324 and adapted to transmit the identification information to the transmitting terminal 32 on the resources corresponding to the upgrade package.

In the embodiment of the invention, by feeding back the upgrade result from the receiving terminal, the problems that the user experience is poor and the application of the FOTA is limited as the server cannot acquire the version upgrade failure information in the related technologies are solved, and the reliability and stability of the system are improved.

Figure 4:
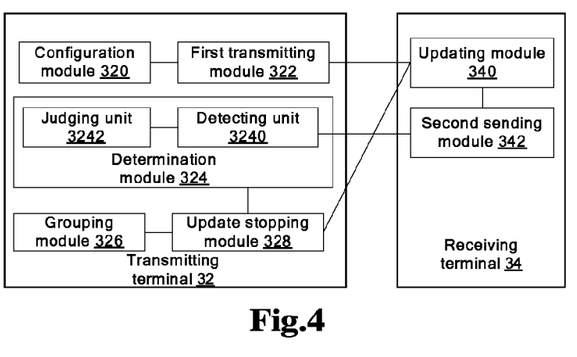
FIG. 4 is a block diagram showing the structure of a device for processing the FOTA upgrade according to one preferred embodiment of the invention.

FIG. 4 is a block diagram showing the structure of a device for processing the FOTA upgrade according to one preferred embodiment of the invention. As shown in FIG. 4, the determination module 324 comprises: a detecting unit 3240 coupled to the second transmitting module 342 and adapted to detect the energy or power of a signal transmitted by the receiving terminal 34 and carrying the identification information on the resources; and a judging unit 3242 coupled to the detecting unit 3240 and adapted to judge whether the energy or power exceeds the predetermined threshold; if so, the receiving terminal 34 fails to be upgraded, otherwise, the receiving terminal 34 is upgraded successfully.

Preferably, the transmitting terminal 32 further comprises: a grouping module 326 adapted to group the receiving terminals 34 that need the same upgrade package into a group; and an upgrade stopping module 328 coupled to the grouping module 326 and adapted to stop the upgrade of the receiving terminals in a group in which the number of the receiving terminals failing to be upgraded reaches the predetermined value.

Preferably, the identification information can be the statistical information in the sequence form or the statistical information in the bit form. For example, the bit information of one bit is used for identifying the upgrade result of the receiving terminal 34, i.e., "0" representing the failed or erroneous upgrade, and "1" representing the successful upgrade.

Figure 5:
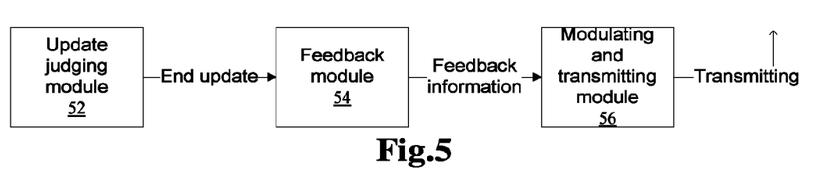
FIG. 5 is a block diagram showing the structure of a receiving terminal according to one preferred embodiment of the invention.

FIG. 5 is a block diagram showing the structure of a receiving terminal according to one preferred embodiment of the invention. As shown in FIG. 5, the receiving terminal 34 comprises: an upgrade judging module 52, a feedback module 54 and a modulating and transmitting module 56, which are described below.

The upgrade judging module 52 is adapted to execute the upgrade process and judge whether the upgrade is successful; the feedback module 54 is adapted to construct feedback information according to the upgrade result; and the modulating and transmitting module 56 is adapted to modulate the feedback information to a high-frequency carrier and transmit it to the transmitting terminal 32.

Preferably, the feedback information constructed by the feedback module 54 can be an orthogonal sequence, an information bit or, a combination of information bits.

Preferably, after the receiving terminal 34 fails to be upgraded, the statistical information is modulated to a high-frequency carrier and transmitted to the transmitting terminal 32 by the modulating and transmitting module 56.

Preferably, after receiving the statistical information, the receiving terminal 34 extracts the statistical information by modulation.

The implementation process of the embodiments of the invention is described below with reference to the embodiments in detail.

First Embodiment

In the embodiment, the FOTA server judges whether a User Equipment (UE) is upgraded successfully by detecting the energy or power of a signal transmitted by the UE and carrying the feedback information of the upgrade result.

Figure 6:
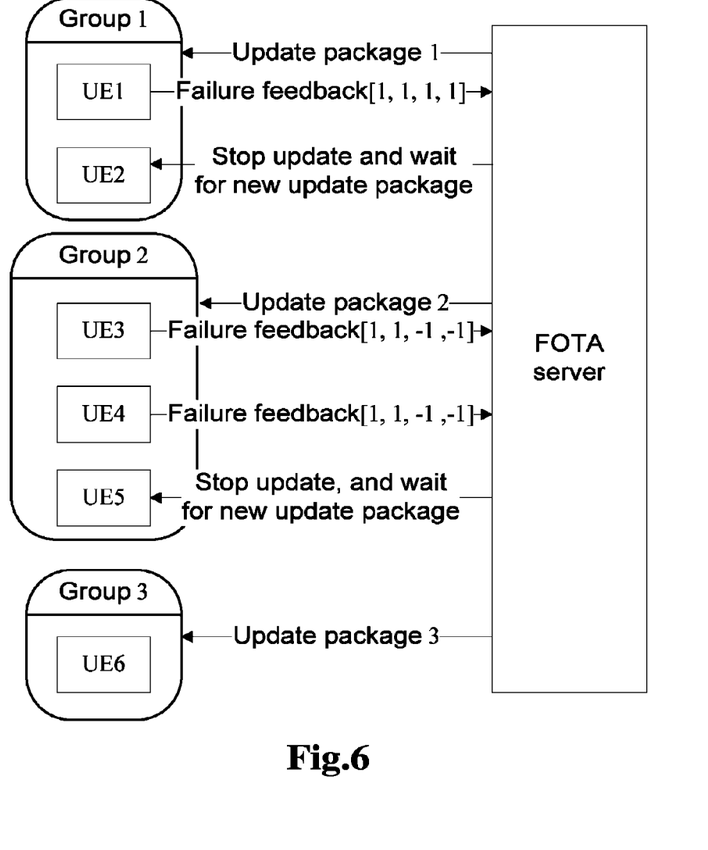
FIG. 6 is a diagram of a method for processing the FOTA upgrade according to the first embodiment.

FIG. 6 is a diagram of a method for processing the FOTA upgrade according to the first embodiment. It is assumed that the FOTA server (i.e., the transmitting terminal) has 3 kinds of upgrade packages for the upgrade of the UEs (i.e., the receiving terminals). For example, UE_group1 (i.e., group 1) comprises UE1 and UE2, and needs the upgrade package 1; UE_group2 comprises UE3, UE4, and UE5, and needs the upgrade package 2; and UE_group3 comprises UE6 and needs the upgrade package 3. If the transmitting terminal needs to count whether 3 kinds of upgrade packages are upgraded erroneously (i.e., failure to be upgraded) respectively at the receiving terminals, then the transmitting terminals need to pre-configure 3 resources in total (such as, resource 1, resources 2, resources 3; can be frequency resources) for transmitting the statistical information after the upgrade of the receiving terminals, for the upgrade feedback of the 3 upgrade packages respectively. For example, when the upgrade package 1 is upgraded erroneously, one sequence in the orthogonal sequence set ([1, 1, 1, 1; 1, 1, −1, −1; 1, −1, 1, −1; and 1, −1, −1, 1] is transmitted to the resource 1; and the 3 sequences in the orthogonal sequence set can correspond to 3 resources respectively.

As shown in FIG. 6, in group 1, UEs in UE_group1 receive an upgrade package 1 and are upgraded. It is assumed that UE1 is upgraded erroneously, and UE1 transmits the sequence [1, 1, 1, 1] over resource 1. The transmitting terminal detects the energy or power of the sequence [1, 1, 1, 1] transmitted by the receiving terminal over resource 1, and if the energy or power exceeds the set threshold of the energy or power, it indicates that a receiving terminal is upgraded erroneously.

In group 2, UEs in UE_group2 receive an upgrade package 2 and are upgraded. It is assumed that UE3 and UE4 are upgraded erroneously. UE3 and UE4 transmit the sequence [1, 1, −1, −1] on resource 2. The transmitting terminal detects the energy or power of the sequence [1, 1, −1, −1] transmitted by the receiving terminal over resource 2, and if the energy or power exceeds the set threshold of the energy or power, it indicates that a receiving terminal is upgraded erroneously.

In group 3, UE in UE_group3 receives an upgrade package 3 and is upgraded. It is assumed that the UE6 is upgraded correctly. UE6 does not transmit the sequence [1, −1, 1, −1] on resource 3. The transmitting terminal detects the energy or power of the sequence [1, −1, 1, −1] transmitted by the receiving terminal over resource 3, and if the energy or power does not exceed the set threshold of the energy or power, it indicates the receiving terminal is upgraded correctly.

It should be noted that, in a specific implementation process, the threshold can be set according to simulation or experience; and when the transmitting terminal detects the threshold of the energy or power, the energy or power can be calculated by performing related calculation on the sequence received and the local sequence.

Figure 7:
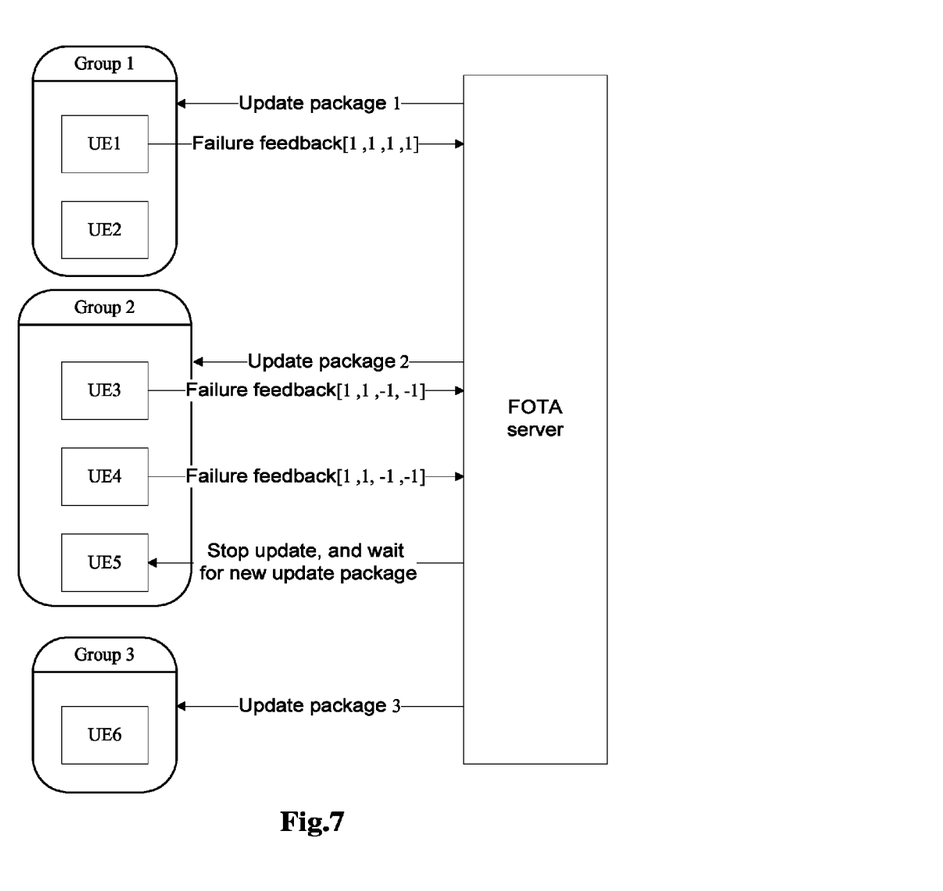
FIG. 7 is a diagram showing that the number of erroneous upgrade in a group reaches a definite value according to the first embodiment.

FIG. 7 is a diagram showing that the number of erroneous upgrade in a group reaches a definite value according to the first embodiment; i.e., setting the threshold as a definite value, and then the upgrade of the members in a group in which the number of erroneous upgrade reaches a definite value is stopped. Specially, FIG. 6 is the situation where one UE is upgraded erroneously. That is, once one member in a group is upgraded erroneously, the upgrade of all the members in the group is stopped.

Second Embodiment

In the embodiment, the FOTA server judges whether a UE is upgraded successfully by detecting the bits of feedback information transmitted by the UE and carrying the upgrade result.

Figure 8:
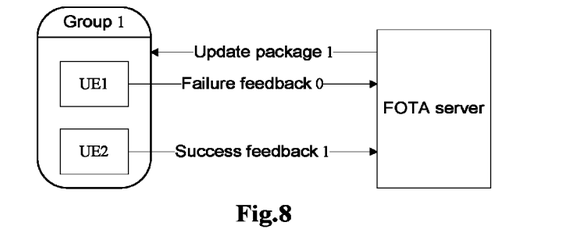
FIG. 8 is a diagram of a method for processing the FOTA upgrade according to the second embodiment.

FIG. 8 is a diagram of a method for processing the FOTA upgrade according to the second embodiment. It is assumed that the transmitting terminal has 3 kinds of upgrade packages for the upgrade of the receiving terminals. For example, UE_group1 comprises UE1 and UE2, and needs upgrade package 1; UE_group2 comprises UE3, UE4, and UE5, and needs upgrade package 2; and UE_group3 comprises UE6, and needs upgrade package 3. If the transmitting terminal needs to count whether each receiving terminal is upgraded correctly or erroneously respectively, in a specific implementation process, the correct/erroneous marker information bits can indicate that a receiving terminal is upgraded erroneously when being "0" and indicate that the receiving terminal is upgraded correctly when being "1", vice versa (i.e., it can be assumed that "0" represents successful upgrade, and "1" represents failed upgrade).

As shown in FIG. 8, the receiving terminal only needs to feed back statistical information of one bit (the bit of the correct/erroneous marker information) if the transmitting terminal has known the upgrade package marker information corresponding to each receiving terminal. For example, UEs in UE_group1 receive upgrade package 1 and are upgraded. It is assumed that UE1 is upgraded erroneously and UE2 is upgraded correctly, then UE1 transmits the bit "0" over its own resource, and the UE2 transmits the bit "1" over its own resource. UE_group2 and UE_group3 follow the same method, and thus they need no further description.

Figure 9:
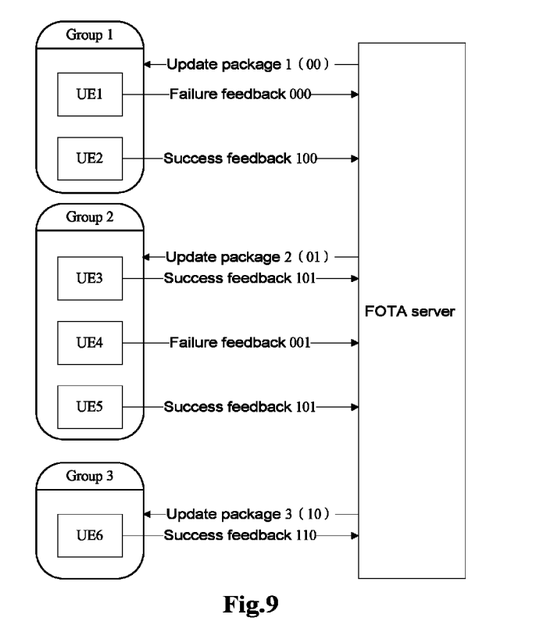
FIG. 9 is a diagram showing that the receiving terminal sends a bit identification carrying upgrade package marker information according to the second embodiment.

FIG. 9 is a diagram showing that the receiving terminal sends a bit identification carrying upgrade package marker information according to the second embodiment. If the transmitting terminal does not know the upgrade package marker information corresponding to each receiving terminal, the receiving terminal needs to feed back the correct/erroneous marker information and upgrade package marker information. It is assumed that the upgrade package marker information corresponding to upgrade package 1 is "00", corresponding to upgrade package 2 is "01", and corresponding to upgrade package 3 is "10".

As shown in FIG. 9, in group 1, UEs in UE_group1 receive an upgrade package 1 and are upgraded. It is assumed that UE1 is upgraded erroneously, and UE2 is upgraded correctly. Then UE1 transmits the bits "000" over its own resources, and UE2 transmits the bits "100" over its own resources. In group 2, UEs in UE_group2 receive an upgrade package 2 and are upgraded. It is assumed that UE3 is upgraded correctly, UE4 is upgraded erroneously and UE5 is upgraded correctly. Then UE3 transmits the bits "101" over its own resources, UE4 transmits the bits "001" over its own resources, and UE5 transmits the bits "101" over its own resources. In group 3, a UE in UE_group3 receives an upgrade package 3 and is upgraded. It is assumed that UE6 is upgraded correctly; the UE6 transmits the bits "110" over its own resources.

It can be seen that the transmitting terminal in the embodiment can determine whether a receiving terminal is upgraded successfully by directly reading the bits.

To sum up, the embodiments of the invention provide a solution for counting the FOTA upgrade, which is adapted to a communication system having the FOTA upgrade function to finish the counting function after upgrade, i.e., a server can count the information of failed upgrade and correct erroneous packages in time, so as to solve the problem that a large amount of terminals fail to be upgraded and need to be returned for repair, and improve the user experience and the reliability and stability of the system.

Obviously, those skilled in the art should understand that the models or steps of the present invention may be implemented by general computing devices and centralized in a single computing device or distributed in a network consisting of multiple computing devices. Optionally, the models or steps may be implemented by program codes executable by the computing devices, so that they may be stored in a storage device and executed by the computing device, or sometimes executed in another order, or made into integrated circuit modules or a single integrated circuit module respectively. By doing so, the present invention is not limited to any specific combination of hardware and software.

The above are only preferred embodiments of the present invention and do not constitute limitation on the present invention. For those skilled in the art, the present invention may have various modifications and changes. Any modifications, equivalent replacements, improvements and the like within the spirit and principle of the invention shall fall within the scope of protection of the invention.

The invention claimed is:

1. A method for processing Firmware Over the Air (FOTA) upgrade, comprising:
   a transmitting terminal configuring resources and transmitting an upgrade package for version upgrade to a receiving terminal, wherein the configured resources is used for feedback an upgrade result of the receiving terminal;
   the receiving terminal being upgraded by the received upgrade package and transmitting identification information which is used for indicating the upgrade result of the receiving terminal to the transmitting terminal over the resources corresponding to the upgrade package; and the transmitting terminal determining the upgrade result of the receiving terminal according to the identification information;

wherein the step that the transmitting terminal determining the upgrade result of the receiving terminal according to the identification information comprises:

the transmitting terminal detecting the energy or power of a signal transmitted by the receiving terminal and carrying the identification information over the resources, and judging whether the energy or power exceeds a predetermined threshold;

when the energy or power exceeds the predetermined threshold, the receiving terminal failing to be upgraded, otherwise, the receiving terminal being upgraded successfully.

2. The method according to claim 1, wherein the identification information comprises at least one of the following: statistical information in a sequence form and statistical information in a bit form.

3. The method according to claim 2, wherein the signal comprises at least one of the following:
one or more sequences of an orthogonal sequence set,
one or more sequences of a self-correlation sequence set, and
of a mutual-correlation sequence set.

4. The method according to claim 3, wherein one sequence in the orthogonal sequence set, the self-correlation sequence set or the mutual-correlation sequence set corresponds to a resource; and different upgrade packages correspond to different resources.

5. The method according to claim 3, wherein the step that the transmitting terminal determining the upgrade result of the receiving terminal according to the identification information comprises: when the identification information is the statistical information in the bit form, the transmitting terminal determining whether the receiving terminal is upgraded successfully according to the bit value of the statistical information in the bit form.

6. The method according to claim 5, wherein before the transmitting terminal determining the upgrade result of the receiving terminal according to the identification information, the method further comprises:

the transmitting terminal receiving the statistical information in the bit form on the resources corresponding to the statistical information in the bit form.

7. A device for processing the FOTA update, comprising a transmitting terminal and a receiving terminal, wherein the transmitting terminal comprises: a configuration module adapted to configure resources; a first transmitting module adapted to transmit an upgrade package for version upgrade to the receiving terminal, wherein the configured resources is used for feedback an upgrade result of the receiving terminal; and a determination module adapted to determine the upgrade result of the receiving terminal according to the identification information which is transmitted by the receiving terminal and used for indicating the upgrade result of the receiving terminal; and the receiving terminal comprises: an upgrading module adapted to perform upgrade by the received upgrade package, and a second transmitting module adapted to transmit the identification information to the transmitting terminal over the resources corresponding to the upgrade package;

wherein the determination module comprises:

a detecting unit adapted to detect the energy or power of a signal transmitted by the receiving terminal and carrying the identification information over the resources; and a judging unit adapted to judge whether the energy or power exceeds a predetermined threshold; when the energy or power exceeds the predetermined threshold, the receiving terminal failing to be upgraded, otherwise, the receiving terminal being upgraded successfully.

8. The device according to claim 7, wherein the transmitting terminal further comprises:

a grouping module adapted to group the receiving terminals that need the same upgrade package into a group; and an upgrade stopping module adapted to stop the upgrade of the receiving terminals in a group in which the number of the receiving terminals failing to be upgraded reaches the predetermined value.

* * * * *